United States Patent

[11] 3,620,639

| [72] | Inventors | Karl Gaffal |
| | | Bobenheim-Roxheim; |
| | | Hans-Dieter Sturm, Frankenthal, both of |
| | | Germany |
| [21] | Appl. No. | 65,890 |
| [22] | Filed | Aug. 21, 1970 |
| [45] | Patented | Nov. 16, 1971 |
| [32] | Priority | Aug. 22, 1969 |
| [33] | | Germany |
| [31] | | P 19 42 762.4 |

[54] PUMP WITH HYDROSTATIC BEARING
10 Claims, 5 Drawing Figs.

[52] U.S. Cl. .................................................. 415/111,
415/169, 415/501
[51] Int. Cl. .................................................. F01d 11/00
[50] Field of Search ........................................... 415/11, 169
A, 501

[56] References Cited
UNITED STATES PATENTS

| 1,504,658 | 8/1924 | Ulmer | 415/169 A |
| 3,404,924 | 10/1968 | Choate | 415/501 |
| 3,459,430 | 8/1969 | Ball | 415/169 A |
| 3,558,238 | 1/1971 | Van Herpt | 415/169 A |

*Primary Examiner*—C. J. Husar
*Attorney*—Michael S. Striker

ABSTRACT: The hydrostatic bearing of an impeller pump is lubricated by a part of the pumped liquid. An auxiliary internal screw pump, pumps an amount of liquid from the main pump outlet to the center of the gap between inner and outer bearing parts. Half the amount lubricates one half of the gap and is discharged into the casing, and the other half is recirculated by the auxiliary pump in the other half of the gap.

PUMP WITH HYDROSTATIC BEARING

BACKGROUND OF THE INVENTION

The present apparatus relates to an apparatus for assuring the supply of pressurized lubricating water to the hydrostatic radial bearing of a centrifugal pump circulating hot water and pumping cold water, particularly with a vertical impeller shaft.

In vertical high-power pumps of the above-described type, the distance between the impeller wheel and the driven end of the impeller shaft is frequently very great. The guide wheel or the diffuser are mounted in the pump casing, or is a part of the same. In such a construction, it is necessary to provide a radial bearing directly adjacent the impeller wheel, and to lubricate the bearing with the pumped liquid.

Pump units having very high rotary speed cannot be readily constructed in such a manner that the lubricating water is completely relieved of pressure in a construction wherein the lubricating water is pressurized in accordance with the pressure differential of the main pump. It is required that the bearing can be easily removed from the casing for servicing, while the casing is filled with liquid and without pressure. For this reason, and assuming that an axial inlet means and the radial outlet means are provided on the pump casing, the hydrostatic bearing cannot be provided on the inlet suction side of the impeller, but must be placed between the impeller and the sealing means by which the impeller shaft is sealed in the casing. This requires a particular flow of the lubricating liquid in the hydrostatic bearing. When the lubricating liquid is pressurized in accordance with the pressure differential of the main pump, there is the danger that upon an overload of the pump, the reduced pressure difference causes an insufficient bearing capacity of the bearing since the lubricating liquid is incapable of spacing the inner and outer parts of the bearing. The same danger is present, if the main pump is supplied with an insufficient flow of liquid, so that cavitation takes place. Such circumstances would require the building of a hydrostatic bearing having very great dimensions, so that for inspection and servicing of the bearing, a difficult and extensive disassembly of the pump is required.

It has been proposed to provide small auxiliary pumps outside of the main pump for supplying pressurized lubricating liquid to the hydrostatic bearing. For safety reasons, particularly if the main pump is used for a nuclear reactor, it is necessary to provide a second auxiliary pump, and a pressure water tank for emergencies.

SUMMARY OF THE INVENTION

It is one object of the present invention to overcome the disadvantages of known pumps provided with hydrostatic bearings, and to provide a simple and inexpensive, but reliably operating pressurized lubricating arrangement for the hydrostatic bearing of a pump.

Another object of the invention is to pump lubricating water to the hydrostatic bearing by an auxiliary pump which is part of the main pump, so that external additional lubricating pumps can be omitted.

Another object of the invention is to provide a lubricating arrangement for a hydrostatic bearing in which a comparatively small amount of the liquid pumped by the main pump is used.

Another object of the invention is to recirculate a part of the lubricating liquid in a part of the bearing.

With these objects in view, the apparatus of the invention provides an auxiliary pump which pumps from the main pressure outlet of the main pump, half of the amount of lubricating liquid which is required by the hydrostatic bearing, and pumps the other half of the required amount from the upper end of the bearing gap so that both halves of the required amount of lubricating liquid, are combined.

An embodiment of the invention comprises supporting means including casing means having a suction inlet and a pressure outlet, the supporting means preferably further comprising a carrier tube and a jacket tube surrounding the impeller shaft; hydrostatic bearing means for the impeller shaft including an inner bearing part secured to the impeller shaft and an outer bearing part secured to the supporting means, and more particularly to the carrier tube and forming with the inner bearing part an annular gap having two axially spaced ends, one of which communicates through the interior of the casing means with the pressure outlet means; and lubricating pump means in the casing means driven by the impeller shaft and having a first inlet communicating with the pressure outlet means, a second inlet communicating with the other end of the gap, and an outlet communicating with a central portion of the gap. Due to this arrangement, half the amount of liquid which lubricates the bearing means, is discharged, and the other half of the amount recirculated by the lubricating pump means in half of the gap so that the pressures at the ends of the gap are substantially equal, and only half of the required lubricating amount need to be taken from the pressure outlet means of the main pump.

The auxiliary pump is preferably an internal screw pump having two axially aligned inner members secured to the impeller shaft and having opposite outer screw threads, and two axially aligned radially outer members secured to the supporting means, such as the carrier tube, and having opposite inner screw threads cooperating with the outer screw threads. The internal screw pump is arranged so that the first and second inlets are located at the axially outer ends, and the outlet is located in the middle.

In such an arrangement, axial forces compensate each other, and the pressure at the sealing means of the impeller shaft is not greater than the pressure at the outlet means of the casing of the main pump.

Preferably, a valve is provided for disconnecting the inlet of the auxiliary pump from the pressure outlet means of the main pump means for sealing the interior of the jacket tube from the space in which the impeller wheel provided, so that by lowering of the impeller shaft, the apparatus is sealed, and the hydrostatic bearing can be removed from the filled pumped casing in which substantially atmospheric pressure prevails.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
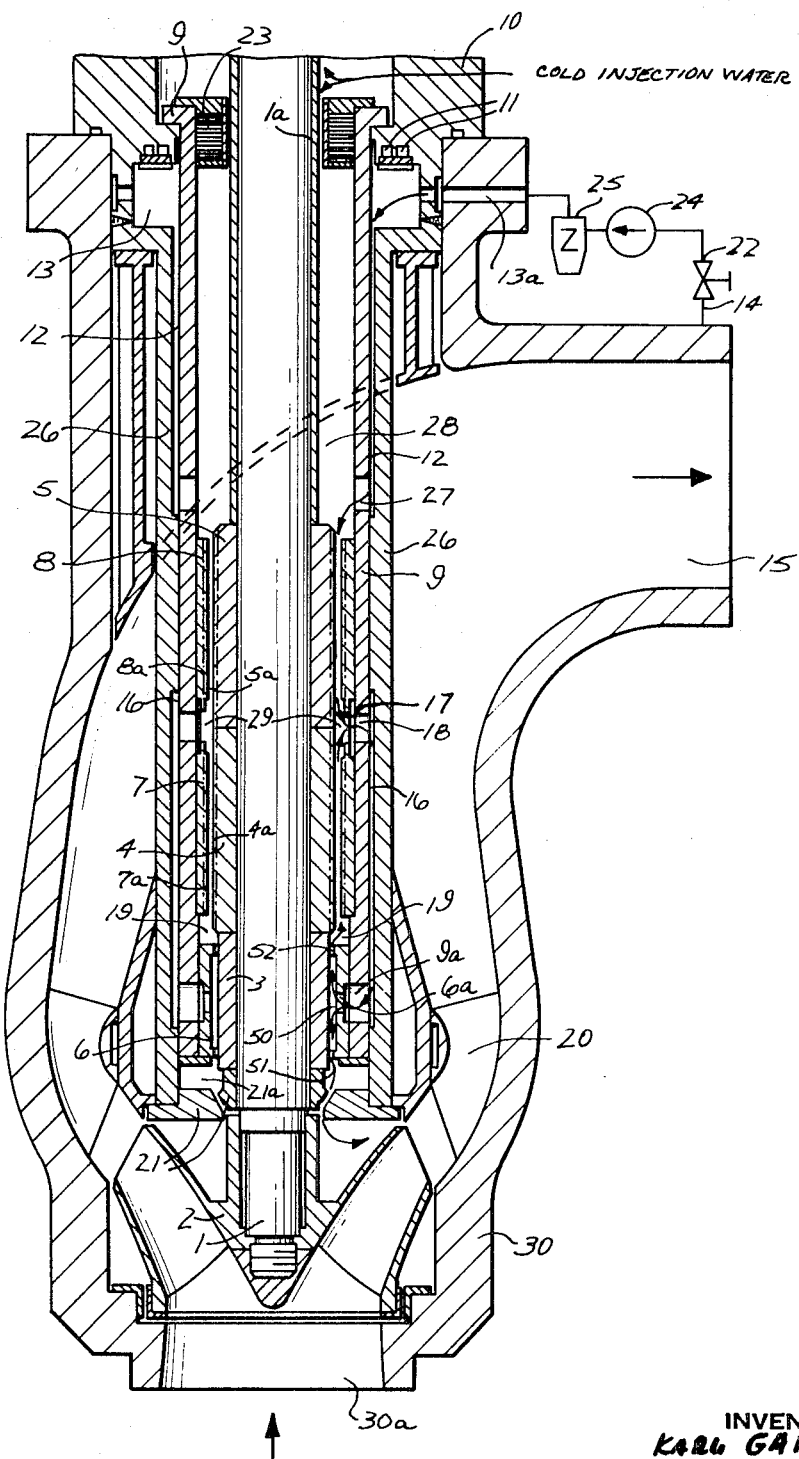
FIG. 1 is an axial sectional view illustrating an embodiment of the invention.

The impeller shaft 1 carries above the impeller 2, the inner rotary part 3 of a hydrostatic radial bearing 3, 6 whose outer stationary part 6 is secured to a carrier tube 9.

Figure 2:
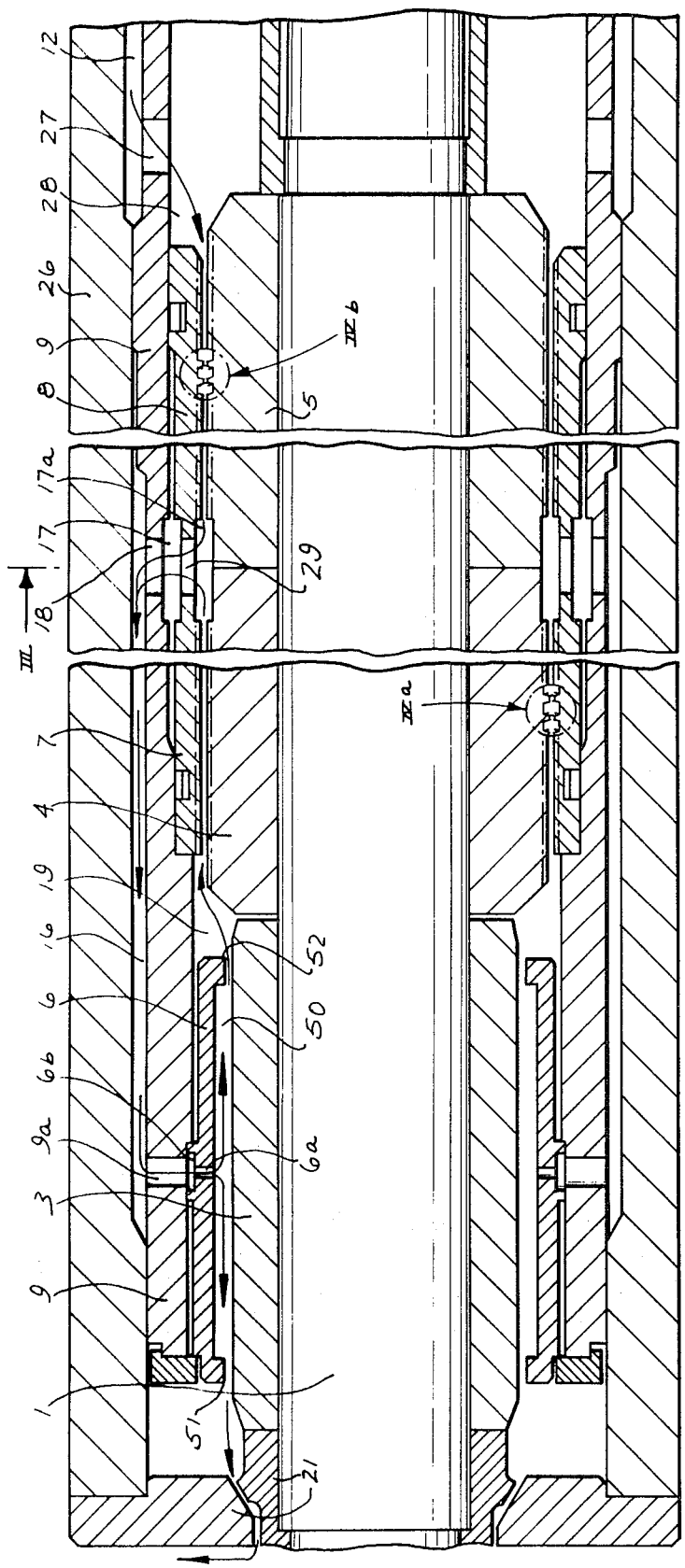
FIG. 2 is a fragmentary axial sectional view illustrating a portion of FIG. 1 on an enlarged scale.
Figure 3:
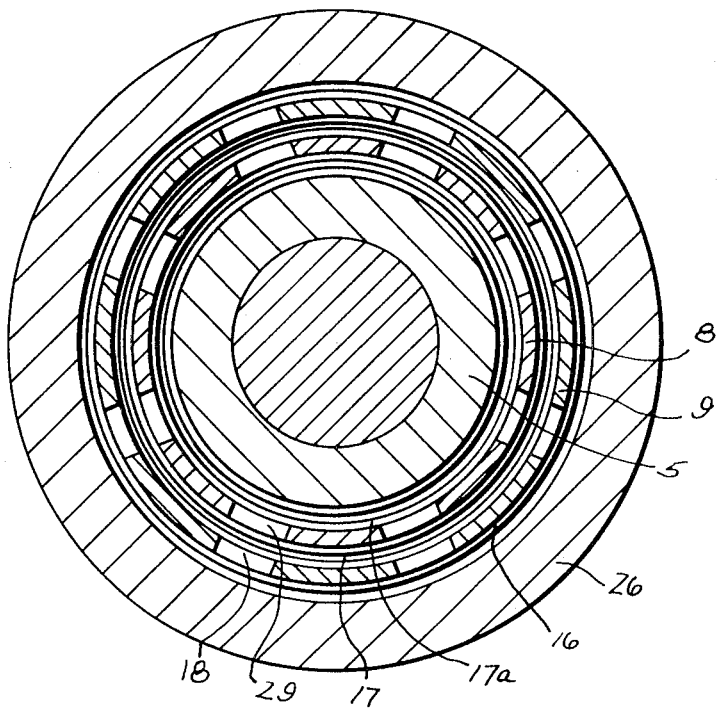
FIG. 3 is a fragmentary cross-sectional view taken on line III—III in FIG. 2.
Figure 4A:
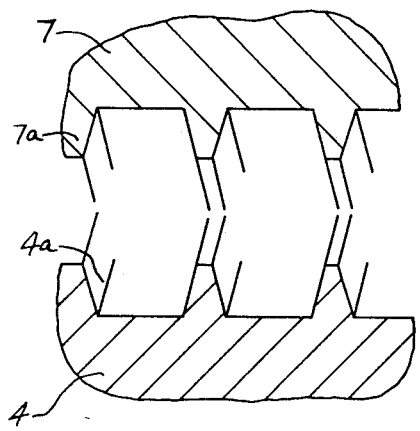
FIG. 4a is a fragmentary sectional view illustrating the region IVa of FIG. 2 on an enlarged scale.
Figure 4B:
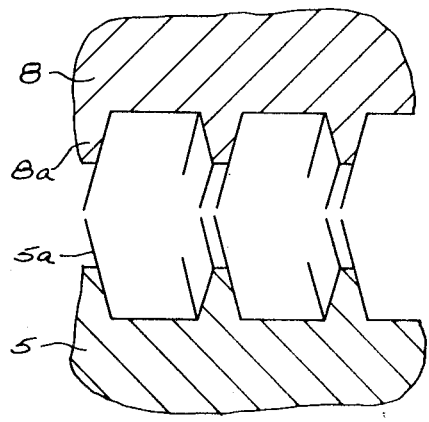
FIG. 4b is a fragmentary axial sectional view taken in the region IVb in FIG. 2.

An auxiliary pump is composed of two inner axially aligned members 4 and 5 secured to impeller shaft 1, and two outer axially aligned members 7 and 8. Member 4 has an outer left-hand thread, member 5 has an outer right-hand thread, member 7 has an inner right-hand thread, and member 8 has an inner left-hand thread, the screw threads cooperating to pump a liquid from the first inlet located at the upper ends of members 5 and 8, and from a second inlet located at the lower ends of members 4 and 7, to an intermediate outlet which includes an annular recess 17a, a plurality of bores 29 in outer member 27, an annular conduit 17, and a plurality of openings 18 in the carrier tube 9, as best seen in FIGS. 2 and 3.

The carrier tube 9 is secured to the cover 10 of casing 30 which has a suction inlet means 30a and a pressure outlet means 15. Inlet means 30a is axially concentric with the impeller 2 and impeller shaft 1, while outlet means 15 projects laterally from the casing 30.

The cooling chambers 11 are provided for forming a thermal barrier. The carrier tube 9 is surrounded by the jacket tube 26 which is also fixedly secured to the cover 10.

Cover 10 and tubes 9 and 26 form at the upper ends thereof an annular inlet chamber 13 which receives pressure fluid through a duct 13a and a supply conduit 24 in which a closure valve 22 is arranged. A supply pump 24, and a cleaning device, such as a cyclone separator Z may be provided in supply conduit 14.

The annular inlet chamber 13 communicates with an annular inlet conduit means 12 formed between the upper ends of the carrier tube 9 and the jacket tube 26. The lower end of the annular inlet conduit means 12 communicates through inlet ducts 27 with the annular chamber 28, and as indicated by arrows, a liquid can flow from inlet means 15 through supply conduit 14, duct 13a, inlet chamber 13, inlet conduit 12, inlet ducts 27, and the lower end of chamber 28 into the upper first inlet of the auxiliary pump 4, 5, 7, 8 and pumped through annular spaces 17, 17a and openings 29 and 18 into an annular connecting conduit 16 formed by the lower ends of carrier tube 9 and jacket tube 26.

From the lower end of connecting conduit means 16, the liquid can flow through openings 16a in carrier tube 9, an annular space 6b formed by the outer bearing member 6, and radial bores 6a in the same, into the gap 50 between the inner bearing member 3 and the outer bearing member 6 which has reduced ends 51 and 52.

The liquid flowing into the center portion of the gap 50 through bores 6a, is divided into two streams, the lower stream flowing from the center portion of the gap and bores 6b through the lower half of the gap 50 and out of the end 51 of the gap into an annular chamber 21a formed between a carrier tube 9, the jacket tube 26, an annular sealing member 21 secured to the lower end of jacket tube 26, and by a second sealing member 21 secured to impeller shaft 1.

Sealing members 21 normally form a gap through which the lubricating liquid which has passed the lower half of the gap 50 and annular chamber 21a, can flow into the interior of the casing 30 in the region of the outer ends of impeller wheel 2 so that this lower lubricating stream is combined with a liquid pumped by the impeller 2, and flows toward the outlet means 15.

The upper stream of lubricating liquid flowing from the central bores 6b into the upper portion of gap 50 and through the upper end 52 of gap 52, flow through an annular chamber 19 into the second lower inlet formed by the members 4 and 7 of the auxiliary pump, and is pumped by the opposite threads upward and out of the outlet 29, 17, 18 back into connecting conduit 16 so that this part of the lubricating liquid is recirculated through the upper half of the bearing gap 50, and the lower half of the auxiliary pump. The entire amount of lubricating liquid which flows through gap 50, also flows through the annular connecting conduit 16.

It will be seen that in accordance with the invention, the lubricating water flows from the pressure outlet means 15 through supply conduit 14 with valve 22 into the annular inlet chamber 13 from where the auxiliary pump 4, 5, 7, 8, pumps continuously through the annular inlet conduit 12 and inlet ducts 27 half of the total amount of lubricating water required by the hydrostatic bearing 3, 6, which half of the amount is pumped through annular chamber 28 to the working chamber between the inner and outer members 5 and 8 of the pump, and out of the outlet 29, 17, 18 into connecting conduit 16. At the same time, the other half of the required amount of lubricating water is drawn from the upper end 52 of gap 50 and transported to the radial bores 29 so that two halves of the required amount of lubricating water flow through outlet 17, 18 into the the connecting conduit means 16 where the two streams join.

It will be noted that only half of the required amount of lubricating water has to be drawn from the pressure outlet means 15 by the auxiliary pump since only half of the amount is discharged from the annular chamber 21a into the interior of the casing 30. The other half of the amount of lubricating water is recirculated between inner and outer members 4 and 7 of the auxiliary pump, and in the annular connecting conduit 16 between the carrier tube 9 and the jacket tube 26.

The stream flowing from the bearing into the lower second inlet of the auxiliary pump, has a low pressure due to its passage through the gap 50 of the bearing means 3, 6.

Since half of the lubricating liquid is recirculated, the inner flow losses of the main pump are reduced.

The described arrangement can also be applied to long impeller shafts in which two hydrostatic bearings are required. In such an arrangement, the auxiliary pump is arranged between the two hydrostatic bearings. Such an arrangement is possible for pumps arranged within the interior of a nuclear reactor. A special pump housing for the auxiliary pump is not required.

When the impeller shaft and the elements mounted on the same are lowered into the casing, the sealing members 21 abut each other and disconnect the annular chamber 21a, and the entire interior of the jacket tube 26 with the auxiliary pump therein from the interior of casing 30, from impeller 2 and from the guide wheel 20. At the same time, the valve 22 is closed so that communication between the pressure outlet means 15 and the inlet duct 13a with inlet chamber 13 is interrupted.

In this condition of the pump, the hydrostatic bearing, and the screw threaded members 4, 5, 7, 8 of the auxiliary pump can be disassembled without requiring emptying of the interior of casing 30.

It may be noted that between the sleeve 1a of impeller shaft 1, and the upper end of the carrier tube 9, an annular thermal barrier 23 consisting of laminated sheets, is provided. Between the annular member 23 and the cooling chambers, cold injection water may be supplied.

The additional pump 24 in supply duct 14 may be provided for the purpose of circulating the lubricating water of the bearing means 3, 6 while the impeller shaft of the main pump is still at a standstill so that the auxiliary pump 4, 5, 7, 8 does not yet operate. When the main pump performs its normal operation with impeller shaft 1 rotating, the additional pump 24 is disconnected.

It will be understood that each of the elements described above, or two or more together, may also find a useful application in other types of pumps having hydrostatic bearings differing from the types described above.

While the invention has been illustrated and described as embodied in a pump provided with a hydrostatic bearing whose lubricating water is partly recirculated, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters patent is set forth in the appended claims.

We claim:

1. Pump with hydrostatic bearing, comprising supporting means including casing means having a suction inlet means and a pressure outlet means; impeller means including an impeller shaft and an impeller for moving a liquid between said inlet and outlet means; hydrostatic bearing means for said impeller shaft including an inner bearing part secured to said impeller shaft and an outer bearing part secured to said supporting means and forming with said inner bearing part an annular gap having two axially spaced ends, one of said ends communicating through the interior of said casing means with said pressure outlet means; and lubricating pump means in said casing means driven by said impeller shaft and having a first inlet communicating with said pressure outlet means, a second inlet communicating with the other end of said gap, and an outlet communicating with a central portion of said gap whereby of the amount of liquid lubricating said bearing means in said gap, half of the amount is discharged at said one end, and half the amount is recirculated by said lubricating pump means in half of said gap so that the pressures at said ends are substantially equal.

2. A pump as claimed in claim 1 comprising conduit means, and a valve in said conduit means for establishing and interrupting communication between said pressure outlet means and said first inlet of said lubricating pump means.

3. A pump as claimed in claim 1 wherein said lubricating pump means include two axially aligned inner members secured to said impeller shaft and having opposite outer screw threads, and two axially aligned radially outer members secured to said supporting means and having opposite inner screw threads cooperating with said outer screw threads, respectively; wherein said inner and outer members have two pairs of axially outer ends forming said first and second inlets, respectively, and two pairs of axially aligned inner ends forming said outlet.

4. A pump as claimed in claim 3 wherein said impeller shaft is vertical; wherein said pressure outlet means is located above said suction inlet means; wherein said first inlet is located above said second inlet; wherein said other end is located above said one end of said gap; wherein the lubricating liquid moves upward in the upper half of said gap and downward in the lower half of said gap; and wherein said impeller is located at the lower end of said impeller shaft means below said bearing means above said suction inlet means.

5. A pump as claimed in claim 1 comprising an annular first sealing member on said impeller shaft adjacent said impeller; and annular second sealing member fixedly mounted on said supporting means in said casing means registering with said first sealing means and axially spaced from the same to form a second gap for the passage of the liquid discharged from said one end whereby axial displacement of said impeller shaft moves said first sealing member to a sealing position engaging said second sealing member and closing said second gap so that said bearing means can be removed from said casing means for servicing.

6. Pump with hydrostatic bearing comprising supporting means including casing means having a suction inlet means and a pressure outlet means; impeller means including an impeller shaft and an impeller for moving a liquid between said inlet and outlet means, a carrier tube surround said impeller shaft, and a jacket tube surrounding said carrier tube; hydrostatic bearing means for said impeller shaft located between said impeller shaft and said carrier tube and including an inner bearing part secured to said impeller shaft and an outer bearing part secured to said carrier tube and forming with said inner bearing part an annular gap having two axially spaced ends, said tubes and said impeller shaft forming an annular space through which one of said ends communicates through the interior of said casing means with said pressure outlet means; lubricating pump means in said casing means including two axially aligned inner members secured to said impeller shaft and having opposite outer threads, and two axially aligned radially outer members secured to the inside of said carrier tube and having opposite inner threads cooperating with said outer threads for transporting a liquid; wherein said inner and outer members have two pairs of axially outer ends forming first and second inlets, respectively, and two pairs of axially aligned adjacent inner ends forming an outlet; wherein said jacket tube and said carrier tube form an annular inlet conduit communicating with said pressure inlet means, and wherein said carrier tube has inlet duct means connecting said inlet conduit means with said first inlet; wherein said carrier tube and jacket tube form another annular space connecting said second inlet with said other end of said gap; wherein said carrier tube and said jacket tube form an annular connecting conduit means, communicating with said outlet, and wherein said carrier tube has connecting duct means connecting said connecting conduit means through an opening in said outer bearing part with the central portion of said gap whereby of the amount of liquid lubricating said bearing means in said gap, half of the amount is discharged at said one end, and the other half of the amount is recirculated by said lubricating pump means in half of said gap so that the pressures at said ends of said gap are substantially equal.

7. A pump as claimed in claim 6 wherein said casing means includes a casing having said inlet and outlet means, and a casing cover closing said casing; wherein said carrier tube and said jacket tube are secured to said casing cover; wherein said impeller shaft passes through said casing cover into said casing; wherein said cover comprises annular thermoinsulating means forming between said carrier tube and said impeller shaft an annular space communicating with said inlet duct and with said first inlet.

8. A pump as claimed in claim 7 wherein said jacket tube, said carrier tube, and said cover form an annular inlet chamber communicating with said inlet duct means; and comprising supply conduit means connecting said pressure outlet means with said annular inlet chamber, and including a valve.

9. A pump as claimed in claim 8 wherein said impeller shaft is vertical; wherein said pressure outlet means is located above said suction inlet means; wherein said first inlet is located above said second inlet; wherein said other end is located above said one end of said gap; wherein the lubricating liquid moves upward in the upper half of said gap and downward in the lower half of said gap; and wherein said impeller is located at the lower end of said impeller shaft means below said bearing means above said suction inlet means.

10. A pump as claimed in claim 6 comprising an annular first sealing member on said impeller shaft adjacent said impeller and bounding said annular space; an annular second sealing member fixedly mounted on said jacket tube in said casing means registering with said first sealing means and axially spaced from the same to form a second gap for the passage of the liquid discharged from said one end whereby axial displacement of said impeller shaft moves said first sealing member to a sealing position engaging said second sealing member and closing said second gap; and valve means for disconnecting said inlet conduit means from said pressure outlet means so that said bearing means can be removed from said casing means for servicing.

* * * * *